United States Patent [19]

Panchula

[11] 4,300,286
[45] Nov. 17, 1981

[54] CORING MACHINE FOR FRANKFURTERS AND THE LIKE

[76] Inventor: George Panchula, 501 Foster Park Rd., Lorain, Ohio 44053

[21] Appl. No.: 186,857

[22] Filed: Sep. 15, 1980

[51] Int. Cl.³ ............................................. A47J 25/00
[52] U.S. Cl. ...................................... 30/113.3; 30/124
[58] Field of Search ....................... 30/113.3, 130, 124

[56] References Cited

U.S. PATENT DOCUMENTS

| | | | |
|---|---|---|---|
| 2,118,976 | 5/1938 | Larkin | 30/113.3 |
| 2,503,064 | 4/1950 | Peterson | 30/113.3 |
| 2,548,165 | 4/1951 | Koch | 30/124 |
| 2,751,864 | 6/1956 | Parker | 30/113.3 |
| 3,161,154 | 12/1964 | Schott | 30/124 X |

*Primary Examiner*—Jimmy C. Peters
*Attorney, Agent, or Firm*—Gustalo Nunez

[57] ABSTRACT

A coring machine particularly designed for coring frankfurters or other similar food substances. The corer as utilized herein contemplates a housing for receiving the frankfurters, a cylindrical guide and a cutting tool. The guide is attached to the housing in a fixed relationship and in operation, the cutting tool is inserted into the cylindrical guide and in and through the frankfurter for coring out a center portion of the frankfurter. The same housing may then be utilized for filling the frankfurter with a suitable filling material.

3 Claims, 8 Drawing Figures

CORING MACHINE FOR FRANKFURTERS AND THE LIKE

BACKGROUND OF THE INVENTION

1. Field of the Invention

This invention relates to a machine for use in coring out a center portion of frankfurters or the like and then filling said cored out center portion with a suitable filling material, such as mustard, ketchup, etc.

2. Description of the Prior Art

Because of the increasing tendency of people to try new foods, to change existing foods into something more novel and delightful, and the mood of the people to enjoy fast foods, it is necessary to develop a simple machine for coring out frankfurters and other similar foods, and which can then be used for filling the cored out frankfurter with a suitable fill material such as mustard, relish, ketchup, or the like. The instant machine is of such a nature that it can be easily used at carnivals, circuses, baseball games and any such function where people congregate and where such energy sources such as electricity are unavailable since the coring machine herein does not require any electrical energy.

Apparatus for accomplishing the above have been patented in the past, however, for the most part, they have proven to be cumbersome, expensive and awkward to work with. It can thus be understood the reluctance of buyers and users who want to modify frankfurters to accept machines of this type because of the unnecessary expense and inefficiency inherent in apparatus of this type.

U.S. Pat. No. 2,359,881 to Serr discloses a coring machine having a cutting element, screw conveyor, pulleys for driving devices all mounted on a heavy base or table. It can be seen that Serr teaches an expensive, mechanically complex corer which is cumbersome to operate and thus not well received by those specialty entrepreneurs who sell foods at carnivals or the like. Serr is designed more for use in a meat packing plant. The invention as practiced by the applicant requires no electrical source of energy, hence, is very portable.

U.S. Pat. No. 2,118,976 to Larkin discloses a coring and filling machine for use with bananas and other fruit. The invention, although used for coring, is mechanically different from that described by the applicant and could not be used to core frankfurters in a manner as contemplated by the instant invention.

Similarly, U.S. Pat. No. 2,548,165 to Koch discloses a machine for coring frankfurters. Koch also consists of a completely different mechanical struct as described by the applicant and could not be used in conformance with the invention taught by the applicant.

For the same reasons as described above, U.S. Pat. No. 2,751,864 to Parker also apply.

SUMMARY OF THE INVENTION

The limitations discussed in the prior art are overcome by the present invention, a simple, portable, inexpensive three piece coring device. The coring device as taught by the applicant comprises a housing for receiving the frankfurter, a cutting tool and a guide way for receiving the cutting tool. The apparatus in operation may be hand held or mounted on a working table. After the coring is accomplished, the frankfurter may be filled with a suitable fill with any conventional filler, e.g. pastry filler.

BRIEF DESCRIPTION OF THE DRAWINGS

Further objectives and advantages of the invention will be hereinafter referred to and/or be apparent from the following description of the preferred embodiment of the improved Coring Machine, shown particularly in the accompanying drawings and set forth in the appended claims.

DESCRIPTION OF THE PREFERRED EMBODIMENT

Figure 1:
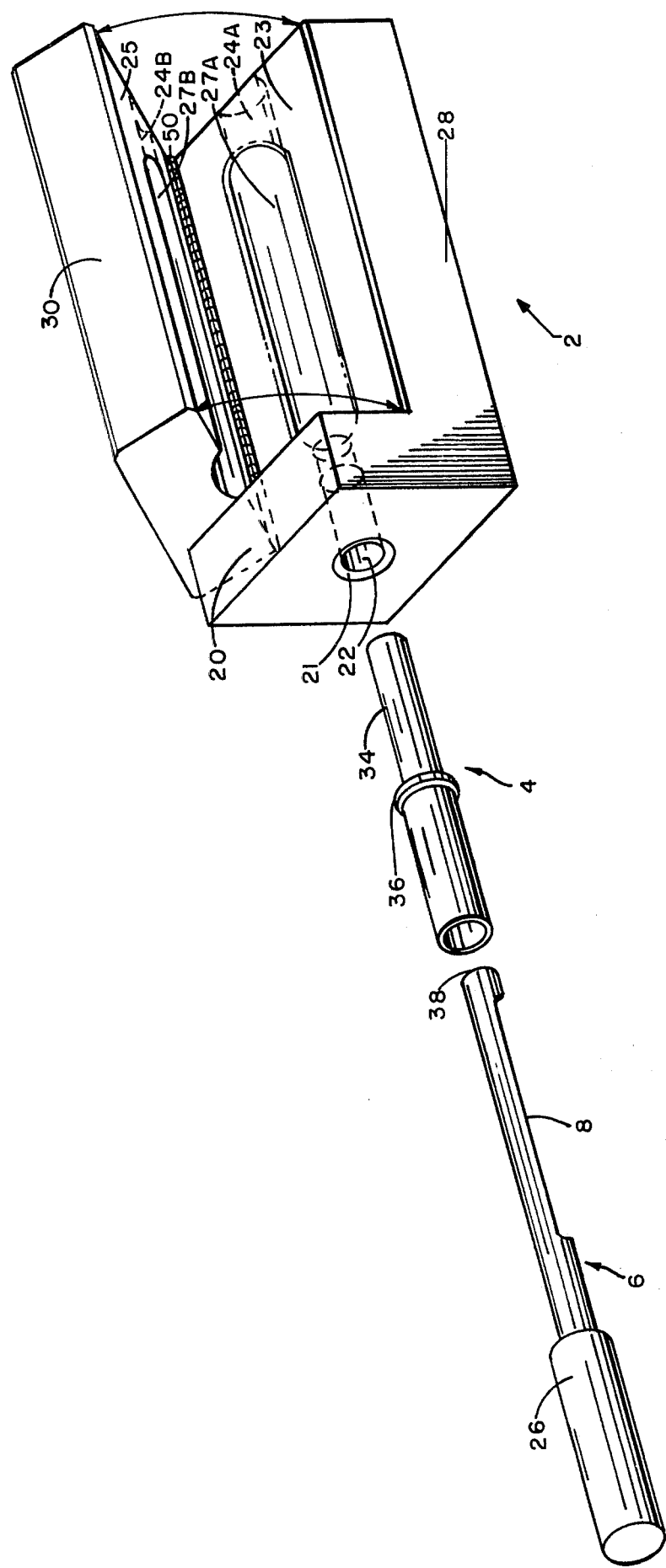
FIG. 1 is an exploded perspective view of one embodiment of the invention.
Figure 7:
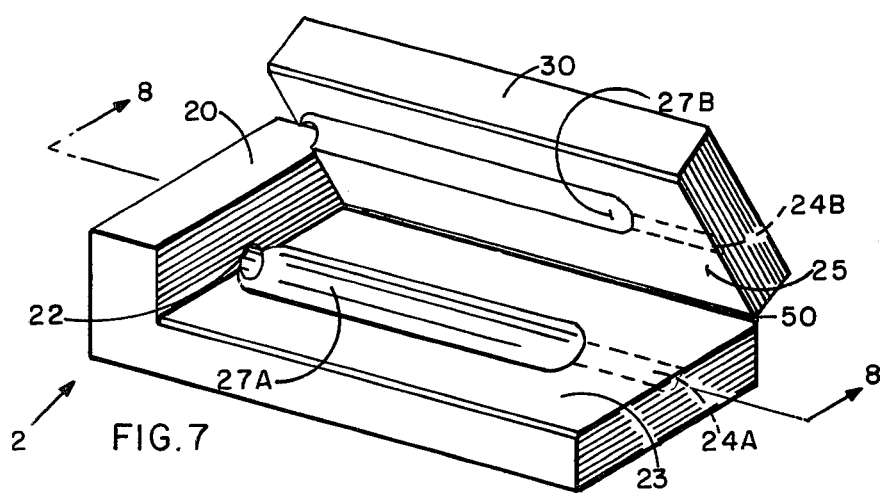
FIG. 7 is a side plan view of the housing.

The invention as illustrated in FIG. 1 comprises a housing 2, a core extractor 6 and a core extractor guide 4. The housing member 2 is comprised of a bottom base member 28 and top member 30. Members 28 and 30 are as are shown in FIG. 1 can be attached to each other by conventional hinges 50 as shown in FIGS. 1 and 7, or can be completely separate from each, depending on the operator's preference. However, it is noted that as a matter of convenience, the invention would be easier to operate and store when hingedly connected together.

Figure 8:
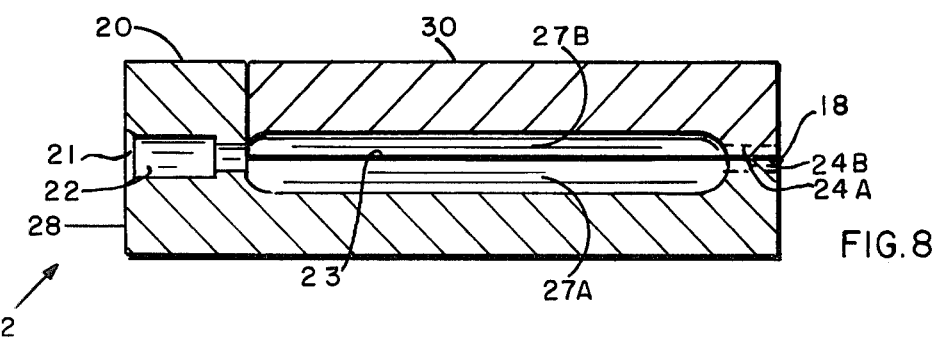
FIG. 8 is a cross sectional view of the housing in a closed position taken at lines 8—8 of FIG. 7.

The bottom member 28 and top member 30 have engraved or molded on the sides which are in contact with each other, i.e., 23 and 25, an elongated semi-cylindrical indentation 27a and 27b, each being the mirror image of each other. The indentations 27a and 27b are of a length and diameter to snuggingly receive and accomodate a frankfurter or the like. The cylindrical indentations 27a and 27b are each respectively connected at one end by a further elongated semi-cylindrical tunnel journaled thereon such that members 23 and 25 are integral with respect to each other, the cylindrical opening form an aperture completely through one end of members 28 and 30 on the sides of the member noted as 23 and 25. The two semi-cylindrical tunnels are noted on FIG. 1 as 24a and 24b, thereby forming aperture 18, see FIG. 8.

Referring again to FIG. 1, the housing 2 is shown at one end as having a shoulder 20. On one face of the shoulder 20 is journaled there through an aperture 22. This aperture 22 is designed to receive another member to be discussed subsequent hereto, and in that regard, the aperture 22 is designed such that it has a sloped indentation 21 at the entrance of the aperture 22 in order to facilitate receiving the other member.

Figure 2:
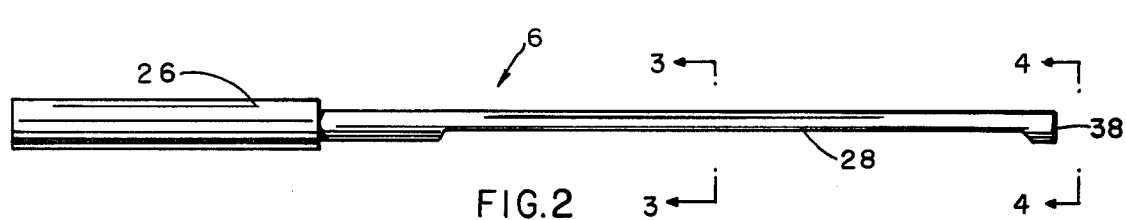
FIG. 2 is a side elevational view of the core extractor tool.
Figure 3:
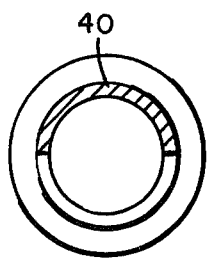
FIG. 3 is a cross sectional view of the core extractor tool taken along lines 3—3 in FIG. 2.
Figure 5:
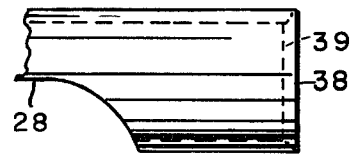
FIG. 5 is a partial side elevational view of the core extractor tool at the cutting end.
Figure 4:
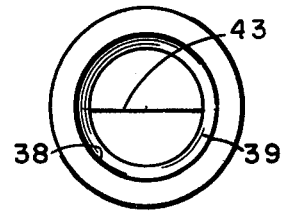
FIG. 4 is a sectional view taken at the cutting end of the core extractor tool.

Referring now to FIG. 1 and also to FIG. 2, attention is now drawn to the core extractor tool 6. The core extractor tool 6 comprises a cylindrical housing having a handle 26 at one end. The other end, which is the cutting part, consists of a semi-cylindrical housing 8 for a portion of it's length and terminating in the form of a full cylindrical housing at it's termination end shown at 38. The termination 38 can best be seen in FIGS. 4 and 5 which discloses the termination 38 as having a tapered sharpened end 39 and a hair line blade 43.

Figure 6:
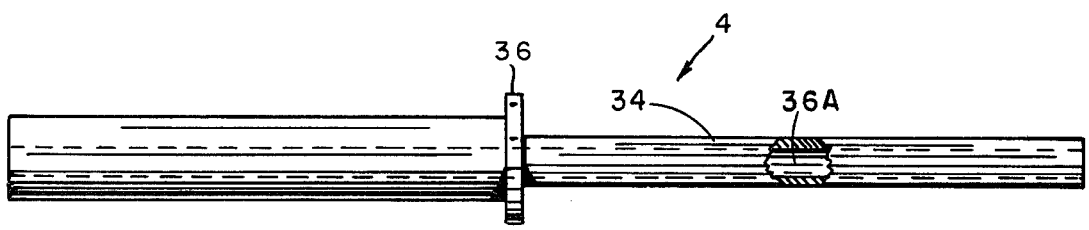
FIG. 6 is a side view with section lines of the core extractor tool guide.

Again referring to FIGS. 1 and 6, and in particular to the guide housing 4, it can be seen that the guide housing 4 is an elongated cylindrical housing having a shoulder 36 at one end. The dimensions of the guide housing 4 are such that the outside diameter at 34 fits in a snuggingly relationship with the inside of aperture 22. The inside diameter of the guide housing is such that the core extractor 6 may slide there through without snagging, see FIG. 6 at 36A.

In operation, the guide member 4 is inserted into the aperture 22. A frankfurter or the like is placed in the elongated indentations 27A and 27B of member 28 and the member 30 is then closed on to side of member 23 thus retaining the frankfurter. The coring member 6 is then inserted in and through the guide tube member 4, and into the housing member 2 for penetration into the frankfurter. Once in the frankfurter, the core extractor 6 is rotated one revolution and then withdrawn, thus removing a core center member of the frankfurter. The frankfurter may then be filling with some fill material through the aperture 22.

However, referring to FIG. 1, the invention is shown with an aperture 24 at the other end formed by tunnels 24a and 24b. In this embodiment, the frankfurter may be filled through this aperture.

The invention can be fabricated from stainless steel or plastic materials. Further, the invention may be designed such that the indentations which hold the hot dog may be interchangeable to accomodate different sizes. This may be done by molding the indentations on dies and simply setting them on the faces of the sides 23 and 25.

As will be apparent to those skilled in the art to which the invention relates, the above described invention should not be limited to the particular construction and method step shown and described, but may be modified, and it is the intention to hereby cover all adaptations, modifications and uses thereof which come within the practice of those skilled in the art to which the invention relates, and should not be so limited but include those changes and modifications coming within the terms of the claims set forth below.

I claim:

1. Apparatus for coring frankfurters and the like, comprising:
   (a) a first member having an opening inscribed thereon, said opening being of the length and shape of a frankfurter cut along it's axis, and
   (b) a second member having an opening inscribed thereon, being the mirror image of said opening on said first member, and positioned such that when said first and second members are placed upon each other, said openings form a mold of the shape and size of a frankfurter, and an aperture formed through one end of said first member, and in axial alignment with the mold formed by said first and second members, and
   (c) a guide tube member adapted to be received by said aperture, and
   (d) a cylindrical elongated coring member for insertion into said guide tube, said aperture and into a frankfurter retained by said mold formed by the first and second members, for coring and removing material from said frankfurter.

2. Apparatus for coring frankfurters and the like, comprising:
   (a) a base member having inscribed thereon an elongated cylindrical semi-tube of a length sufficient to receive a frankfurter, and
   (b) a top member moveably affixed to said base member and having inscribed thereon an elongated cylindrical semi-tube being the mirror image of the cylindrical semi-tube inscribed on said base member such that when the base member and top member are integral to each other, a complete elongated cylindrical tube is formed such that said tube has the capacity to receive and retain a frankfurter, and
   (c) said base member having on one end a shoulder including an aperture formed completely there through and in axial alignment with the center of said elongated cylindrical tube, and wherein said aperture being of a smaller diameter with respect to said cylindrical tube, and
   (d) an elongated cylindrical guide tube member of a diametric size capable to be received in a snuggingly relationship within said aperture, and
   (e) an elongated coring member, cylindrical at both ends and semi-cylindrical at a certain section of said coring member, said coring member having at one end thereof sharpened edges and a blade diametrically affixed at said end, said coring member having a handle at the other end, said coring member being further designed to slidingly fit in and through said elongated guide tube, said aperture and in and through a frankfurter for coring said frankfurter and securing said cored material for removal.

3. The coring apparatus of claim 1 wherein said base and top members are provided with an aperture at an end opposing said aperture formed on the shoulder of said base member for filling said cored frankfurter with some fill material.

* * * * *